Jan. 15, 1935.  W. L. O'NEILL  1,987,703
CONTROL MECHANISM FOR ELECTRIC TOASTERS OR THE LIKE
Filed Jan. 30, 1934   2 Sheets-Sheet 1
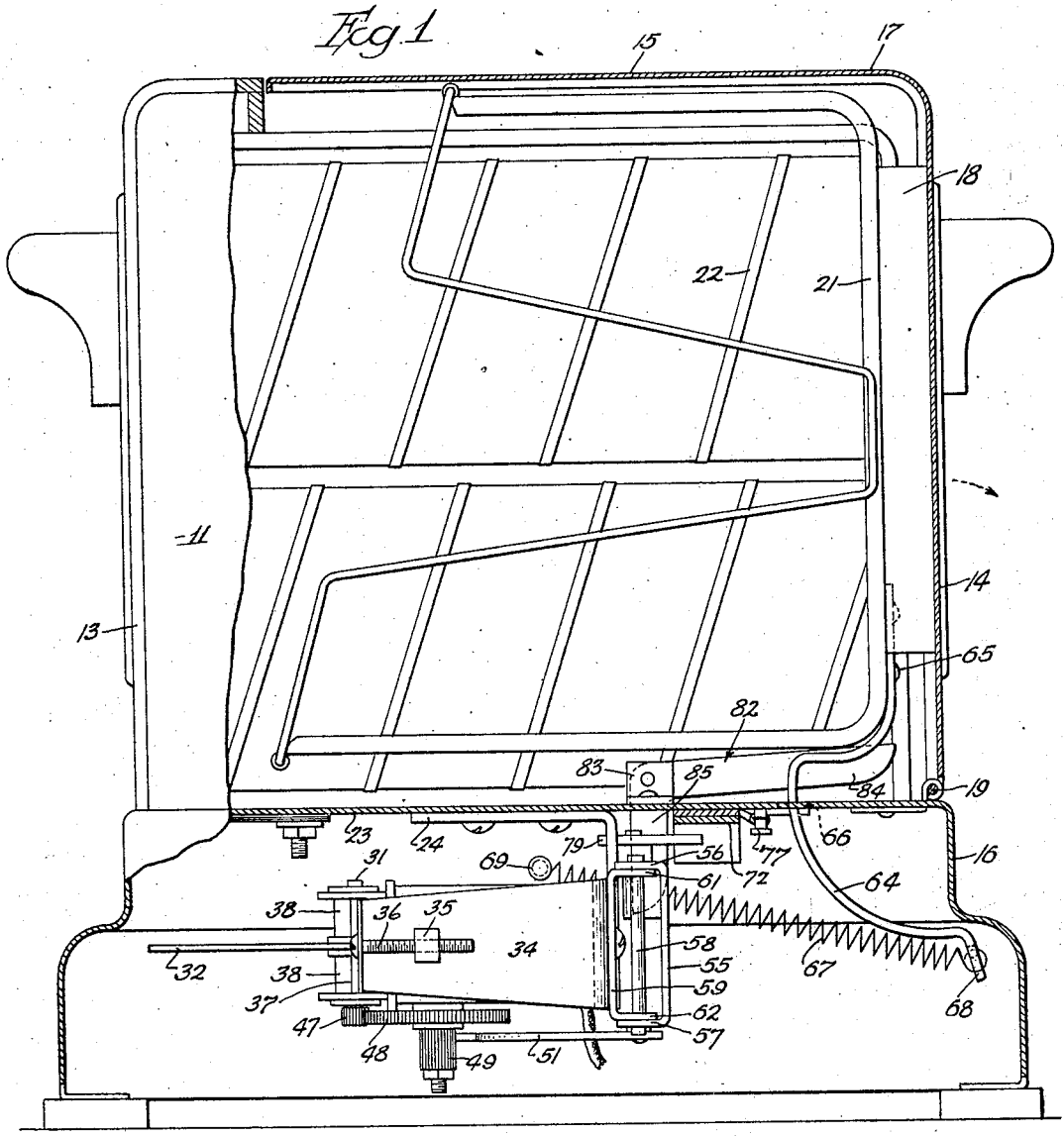
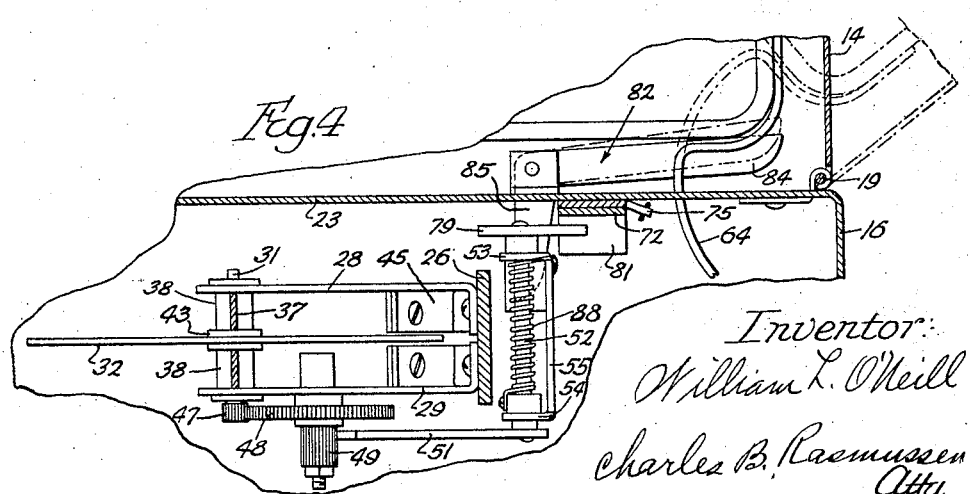
Inventor:
William L. O'Neill
Charles B. Rasmussen
Atty.

Jan. 15, 1935.   W. L. O'NEILL   1,987,703
CONTROL MECHANISM FOR ELECTRIC TOASTERS OR THE LIKE
Filed Jan. 30, 1934    2 Sheets-Sheet 2
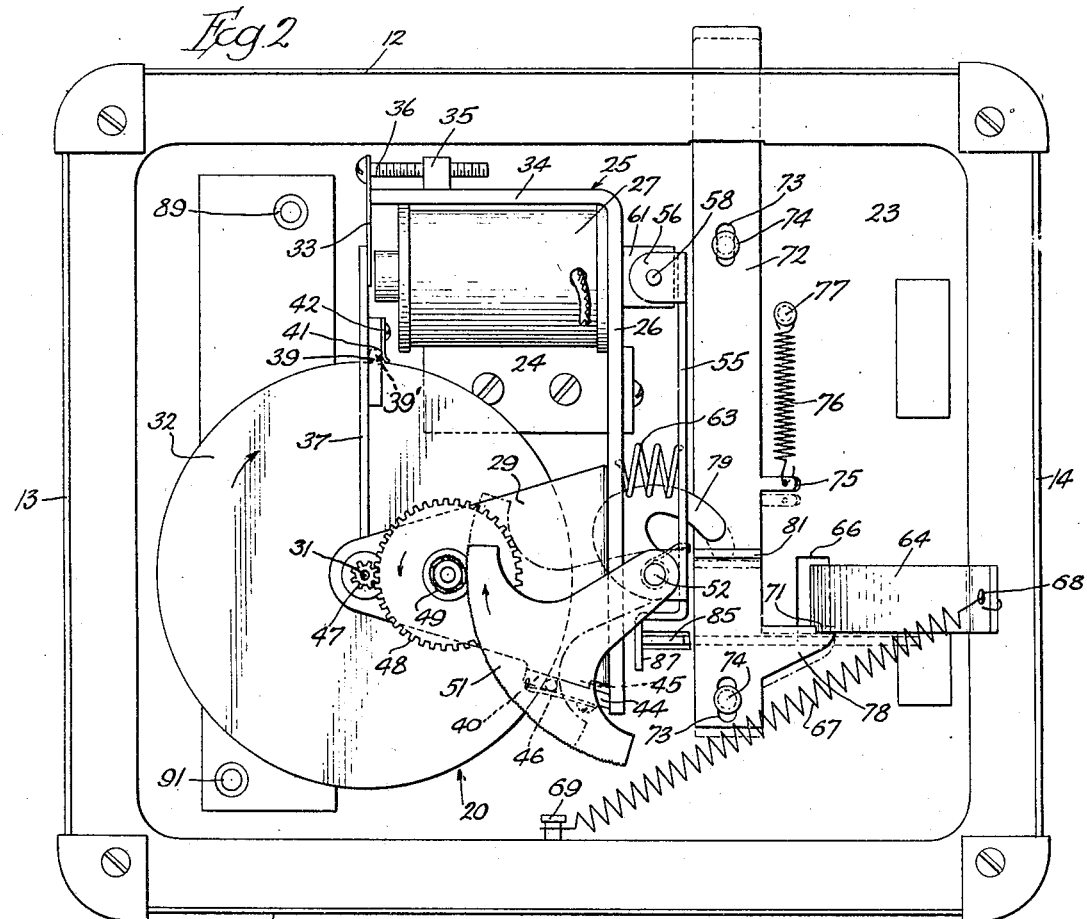
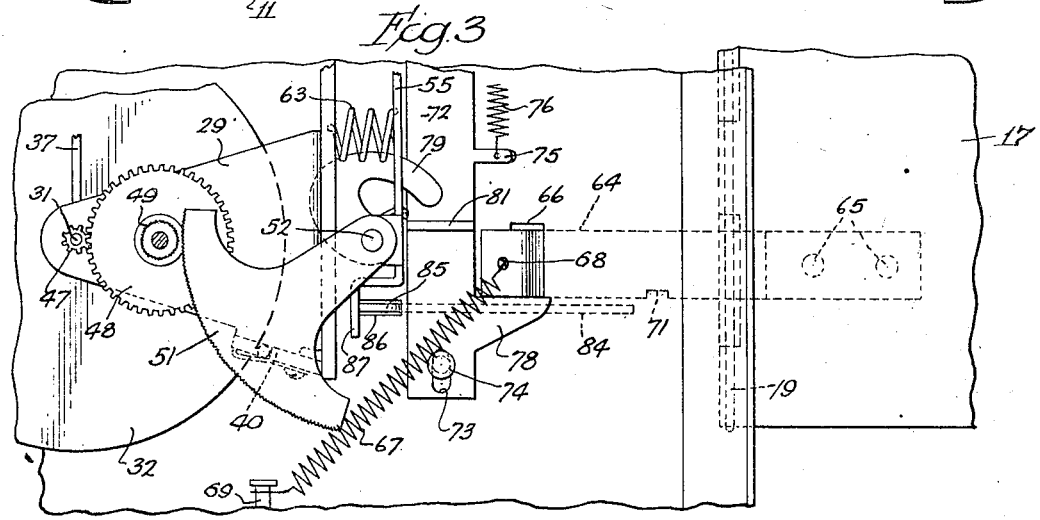
Inventor:
William L. O'Neill
Charles B. Rasmussen
Atty.

Patented Jan. 15, 1935

1,987,703

UNITED STATES PATENT OFFICE 1,987,703

CONTROL MECHANISM FOR ELECTRIC TOASTERS OR THE LIKE

William L. O'Neill, Chicago, Ill.

Application January 30, 1934, Serial No. 708,990

9 Claims. (Cl. 161—16)

This invention relates in general to bread toasters and has more particular reference to toasters which may be set for a predetermined period of time to toast the bread to the desired degree of crispness. While the invention illustrated on the drawings is embodied in an electric toaster, it will be readily apparent that it may be adapted for use in various other types of cooking apparatus in which it is desired to maintain a member in position for a predetermined time and release such member automatically at the expiration of such predetermined period.

An important object of the invention is the provision of a control mechanism adapted to be actuated when the member to be controlled reaches a predetermined position from which it is to be released.

A further important object of the invention is the provision of a control mechanism for timed cooking operation, in which release of a locking element from locking position is induced by a continuously rotating motor.

A further object of the invention is the provision of a control mechanism for releasing a locking element of the member to be controlled, the release means being operative under control of a continuously rotating motor and being automatically returned to starting position when released from said motor.

Another important object of the invention is the provision of a control mechanism in which a locking device for the member to be controlled automatically enters locking position when the member reaches a predetermined position, the locking device being releasable alternately under the control of a motor independently of the manual operation of the locking device.

Numerous other objects and advantages of the invention will be understood from the following description, which, when taken in connection with the accompanying drawings, illustrates a preferred embodiment thereof.

On the drawings,

Figure 1 is a front elevation of a toaster, partly in section, showing the control mechanism as incorporated in a toaster, parts being shown in operative position;

Fig. 2 is a bottom plan view of the control mechanism in closed position for effecting the release of the locking means;

Fig. 3 is a fragmentary bottom plan view showing parts of the control mechanism in open position;

Fig. 4 is a fragmentary detail view, partly in section, showing the parts in closed position.

Referring to the drawings, the toaster in which my invention is embodied comprises a sheet metal casing having front and back walls 11, 12, end walls 13, 14, top wall 15, and a base compartment, generally indicated by reference character 16. The front and back walls 11, 12, end wall 13, and base compartment 16 are suitably connected together to form a unitary structure. The end wall 14 and top wall 15 are formed continuously in one piece and constitute a support 17 for the bread carrying frames or racks 18. This support 17 is hingedly connected to the base at 19 in any suitable manner.

Suitably positioned within this casing are a plurality of frames or cages 21, and a set of heating elements 22 are secured within each frame 21 and connected in the usual manner to a source of electric current. The bread carrying rack 18 may be of any preferred construction, fixedly secured to the support 17 and is adapted to insert and hold the bread between two adjacent heating elements while toasting is being accomplished.

The mechanism for latching the support 17 in operative position, is mounted on a plate 23. This mechanism and its associated parts are disposed within the base compartment 16.

A motor, generally indicated at 20, is secured to the plate 23 by means of a bracket 24 having a horizontal arm fastened by screws to the plate 23. The vertical arm of the angle bracket 24 serves to support an angle bracket 25 (Fig. 2) to which the motor is attached. This bracket 25 has an arm 26 fastened to the vertical arm of the bracket 24, and carries the actuating part, as well as the actuated part, of the motor. The actuating part, in the form of an electro-magnet 27, is shown to be directly mounted on the bracket 25. Bearing brackets, comprising plates 28, 29, are secured to the arm 26 and support the actuated part. The free ends of the bearing plates are in vertical alinement and rotatably support a shaft 31 for the disk 32.

The electro-magnet 27 has an iron core in front of which a vibratory armature 33 is located. This armature is maintained in a position to vibrate in accordance with the fluctuations of current in the electro-magnet, and for this purpose the rear end of the armature 33 is secured to an adjustable support united with the bracket 25. The shorter arm 34 of this bracket 25 is provided with a lug 35 through the tapped opening of which the adjustable armature support in the form of a screw 36 extends. The rear portion of the armature is secured to this screw in such manner that an intermediate portion of the armature 33 may be forced more or less firmly into engagement with the free edge of the arm 34 of the bracket 25, as shown in Fig. 2. Depending upon the adjustment of the supporting screw 36 with reference to the bracket, more or less tension may be applied to the armature plate 33 between its ends to vary the amplitude of vibration thus providing a timing adjustment for the toaster.

The end of the armature plate is located directly opposite the core of the electro-magnet 27. Near this end, the armature plate 33 is connected with an iron bar 37, longitudinally slotted to permit the driven element to pass between the edges of the slot. The two prongs thus formed on the bar 37 terminate each in a loop 38 which may constitute bearings for the shaft 31.

Mounted intermediate the ends of the bar 37 is a ball clutch, indicated generally at 39. This clutch 39 comprises a block 41 fixedly mounted on the bar 37, a ball 39' rotatably seated on the block, and a spring blade 42 secured at one face of the block 41 in such manner that it yieldingly holds the ball on its seat and in engagement with the actuated member 32. Clutches of this character, wherein a ball is caused to produce a pushing effect on a movable part when the ball is constrained in a certain direction, are well known, and detailed description is not believed necessary here. In these clutches a force exerted on the ball in the opposite direction wedges the ball on its seat without producing this pushing effect. The clutch, therefore, acts solely as a unidirectional coupler and as a lock against movement in the opposite direction.

The disk 32 is fixedly secured to the shaft 31 and is provided with a hub 43 spaced midway between the two bearings 28, 29 by the prongs of the clutch carrier 37 and loops 38. A similar ball clutch 40 is mounted on the bearing plates 28, 29, which also includes a block 44 secured to an angular extension 45 of each of the bearing plates and bifurcated to have its prongs located above and below the disk 32.

A spring 46, similar to the spring 42 of the ball clutch 39, is secured to the support 44 of ball clutch 40 for holding its ball in a suitable pocket or recess of the support 44 in engagement with the face of the disk 32. This pocket and the ball therein are disposed in such manner that a rotary movement of the disk 32 is made possible in one direction only, and upon said disk being constrained to move in the opposite direction, the ball is forced against said disk and thereby exerts a braking effect, preventing said disk 32 from moving in the opposite direction.

It will be apparent that the ball clutch 39 constitutes a driving clutch, and the ball clutch 40 a holding clutch permitting the movement of the disk 32 in one direction only.

A pinion 47 is secured to the shaft 31 with which the disk 32 is fixedly combined. This pinion is in mesh with gears 48 which is rotatably supported by the lower bearing plate 29 (Fig. 4). The gear 48 is united with another pinion 49, having a plurality of small teeth to cooperate with a gear sector 51, the teeth of which have a similar configuration whereby a gear or friction drive is imparted to the sector 51.

The gear sector 51 is fixedly secured to a shaft 52. This shaft is rotatably mounted between a pair of struck out lips 53, 54 at one end of the operating arm 55, which at its opposite end is provided with another pair of laterally extending tongues or lips 56, 57 for receiving a pivot pin 58 about which the operating arm 55 may swing. The pivot pin 58 is or may be fixedly secured in another bracket 59 which also has lateral lips 61, 62 located between the lateral tongues 56, 57 of the arm 55, this second bracket 59 being fixedly mounted on the long arm 26 of the bracket 25, earlier described.

A spring 63 is interposed between the fixed bracket 25 and the operating arm 55 and constrains the latter to swing about the pivot pin 58 in a certain direction to space the sector 51 sufficiently from the pinion 49 for interrupting the engagement between the sector and the pinion, Fig. 3.

A rigid strip 64, which in the embodiment shown on the drawings is of peculiar curved shape, is fixedly secured at 65 to the supporting member 17 and extends through an opening 66 in the base plate 23. A spring 67 is secured at 68 to the end of the strip 64 and is anchored at 69 to the side wall of the base compartment 16 in which the operating mechanism is located.

This spring is arranged in such manner that it has a tendency to urge the supporting member 17 outwardly to open position by exerting a pull on the end of the strip 64 below the hinge 19. It will be apparent that when the support 17 is released, this spring 67 will automatically urge the support to open position, as indicated in dotted lines in Fig. 4. In order to lock the support 17 against the force of spring 67, the strip 64 is provided with a notch 71 in one of its longitudinal edges. A locking element automatically enters this notch when the support 17 is moved to closed position and holds this support in closed position until this locking element is withdrawn from the notch, as will be presently described.

The locking element comprises a bar 72 which is guided in a predetermined path of movement on the base plate 23. For this purpose the bar 72 is provided with a pair of slots 73, and headed pins 74 secured to the base 23 project loosely through these slots. This bar 72 extends outside the base compartment 16 (viewing Fig. 2) to provide for manual operation of the locking element within limits of the guide slots 73.

The bar 72 is constrained to occupy a predetermined position and for this purpose a lateral finger 75 is provided, in which the end of a spring 76 is engaged, the opposite end of the spring being anchored at 77 to the base 23. This spring normally urges the locking bar into latching engagement with the notch in the strip 64. The bar 72 is also provided with a laterally projecting arm 78 which is adapted to enter the locking notch of the strip 64 to lock the support 17 in closed position for the toasting operation.

When the bar 72 is shifted against the normal action of the spring 76, either manually or automatically, the arm 78 will be moved to unlocking position, and the spring 67 will then move the support 17 to open position.

For the purpose of moving the locking bar 72 to release position under the action of the control mechanism, the shaft 52 on which the sector 51 is fixedly secured, is also provided with an arm 79 (viewing Fig. 2) of curved form and having a tip adapted to engage a projection 81 which rises from the bar 72. During the rotary movement imparted to the sector 51 by the gear 48 actuated from the disk 32, the arm or finger 79 will be slowly moved clockwise to impinge the projection 81, and continuing this movement, the bar 72, under the influence of this finger 79, will be shifted to force the arm 78 out of engagement with the notch 71 in the strip 64.

This movement, however, takes place only when the sector is in operative relation with the driving pinion 49.

The spring 63, earlier described, normally tends to keep the arm 55 out of engagement with the driving pinion 49 and means are provided for moving the sector 51 into operative engagement with driving pinion 49, which means becomes effective when the support 17 is moved to closed position, as will now be described.

A bell crank lever 82 is mounted in a bracket 83 secured to the base plate 23. This bell crank lever has an arm 84 extending into the toasting compartment and another arm 85 extending into the base compartment 16. The arm 85 projects through a slot 86 in the base 23 and is adapted to engage under slight pressure a deflected portion 87 of the operating arm 55.

A part of the holding rack 18, combined with the member 17, is adapted to overlie the arm 84 of the bell crank lever when the supporting member 17 has been moved to closed position (viewing Fig. 1), and owing to the pressure exerted upon the arm 84 from above, the arm 85 will be urged into engagement with the deflected part 87 of the operating arm 55 to move this arm against the action of spring 63, and also to move the sector 51 to operative engagement with the driving pinion 49. When the support 17 is swung to open position, as shown in Fig. 4, the spring 63 moves the arm 55 about its pivot pin 58 to release position, which moves the sector 51 out of engagement with the driving pinion 49.

A tension spring 88, secured at its lower end to the shaft 52 and held at its upper end to lip 53 of the operating arm 55, normally urges the sector 51 in a counter clockwise direction (viewing Fig. 3) to initial starting position.

The operation of the device will now be described. Electric current is supplied to the heating elements 22 through the usual conductors attached to posts 89 and 91 (Fig. 2) and the electro-magnet is energized. Upon energizing the electro-magnet, the disk 32 rotates continuously under the influence of the clutches. The supporting member 17 is then moved to open position by pressing the locking bar 72 against the action of spring 76 which moves the projection 78 out of engagement with notch 71 in the strip 64. The slices of bread are then inserted in the racks and the support moved to closed position. This closing movement causes the operating arm 55 to be pressed by the arm 85 toward the stationary bracket 25 until the sector 51 is in engagement with the continuously rotating driving pinion 49.

Under the influence of this driving pinion, sector 51 is advanced until the finger 79 which pushes against projection 81 of the locking bar, has moved the part 78 out of locking engagement with the notch 71, whereupon the spring 37 moves the support 17 to open position. When the support 17 moves to open position the sector 51 is moved back to initial starting position under the influence of spring 88.

The flow of current through the electro-magnet is not affected by the position of the support 17 but the sector is connected with the motor only when the support 17 is in closed position. It will be apparent that the time during which this cover or support 17 remains in closed position is dependent solely upon the movement of the sector 51 and its associated finger 79.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a control mechanism for an electric toaster, the combination of heating means, a toast holding member to be controlled, a locking bar, the toast holding member being provided with a notch, means for automatically seating said locking bar in said notch when the toast holding member is in a predetermined position, a motor, a bracket pivotally connected with the motor, a release element pivotally supported on the bracket, a bell crank lever in the path of the toast holding member and in engagement with said bracket and adapted to impart movement to said bracket relatively to the motor for establshing driving connection between the motor and the release element when said toast holding member is moved to operative position relative to said heating means, means on the locking bar in the path of said release element for forcing the locking bar from the seat, means for moving the bracket on which the release element is mounted away from the motor, and means on the bracket for swinging said release element to its initial position when the bracket is moved away from the motor.

2. In a control mechanism for an electric toaster, the combination of a toast holding member to be controlled, a locking bar, guiding means for said locking bar, said member being provided with a notch, means for constraining the locking bar to move into the notch when the member is in a predetermined position, the locking bar being provided with a projection, a motor, a bracket movably secured to the motor, a release element movably mounted on the bracket, means for normally spacing said bracket from the motor, means for normally maintaining the release element in a position remote from the projection of the locking bar, and means operable upon the approach of the member to said position for moving the bracket to operative position with respect to the motor and for imparting movement to the release element through said motor in direction towards the projection of the locking bar.

3. In a control mechanism for an electric toaster, the combination of a toast holding member to be controlled, a support to which said member is pivotally secured, a locking bar slidable on said support, means constraining said locking bar to enter locking relation with said member when the latter has reached a predetermined position relatively to the support, a motor secured to said support, a bracket movably mounted on the motor, means interposed between the motor and said bracket for holding the bracket normally away from the motor, means mounted on said support in the path of the member for moving said bracket to near position relatively to the motor, a release element rotatably mounted on the bracket, means actuated by the motor for imparting rotation to said release element when the bracket has been moved to near position in respect of the motor, and means on said release element for moving the locking bar out of locking relation relatively to the member when said release element has been moved by the motor through a predetermined path.

4. In a control mechanism for an electric toaster, the combination of heating means; a toast holder mounted for movement into and out of operative relation with respect to said heating means; latch mechanism for releasably maintaining said toast holding member in operative position, said latch mechanism being provided with a shouldered portion; an electric motor provided with a rotatable member; and a pivotally mounted arm provided with an arcuate portion arranged concentric with its axis of pivotal movement and with a finger portion, means operable when said toast holding member is moved into its operative position, for bodily moving said arm into a position in which the arcuate portion thereof is in driving engagement with the rotatable member of said motor whereby said arm is swinging to a position in which the finger portion thereof engages the shouldered portion of said latch to actuate said latch mechanism to release said toast holding member at the expiration of a predetermined interval of time.

5. In a control mechanism for an electric toaster, the combination of heating means; a toast holder mounted for swinging movement into and out of operative relation with respect to said heating means; latch mechanism for releasably maintaining said toast holding member in operative position, said latch mechanism being provided with a shouldered portion; an electric motor; an arm, means for supporting said arm and for bodily moving the same to and from a position in which it is adapted to be moved by said motor into engagement with said shouldered portion of said latch mechanism for actuating said latch mechanism to release said toast holding member at the expiration of a predetermined interval of time, and a bell crank lever adapted to be engaged by said toast holder when the same is swung to its operative position to move said supporting means and said arm into operative relation with respect to said motor.

6. In a control mechanism for an electric toaster, the combination of heating means; a toast holding member mounted for movement into and out of operative relation with respect to said heating means, said toast holding member being provided with a notched portion; a locking bar mounted for movement into and out of locking engagement with said notch; means for automatically seating said locking bar in said notch when the toast holding member is in operative position relative to said heating means; a motor; a bracket pivotally connected with said motor; a release element pivotally supported on said bracket; a bell crank lever adapted to be actuated by said toast holding member when the same is moved into operative position for imparting movement to said bracket for establishing a driving connection between said motor and said release element; means on said locking bar for engagement by said release element at the expiration of a predetermined interval of time for moving said locking bar from engagement with said notch to release said toast holding member; means for moving said bracket and said release element out of operative relation with respect to said motor; and means on said bracket for swinging said release element to its initial position when said bracket is moved to an inoperative position with respect to said motor.

7. In a control mechanism for an electric toaster, the combination of heating means; a toast holding member mounted for movement into and out of operative relation with respect to said heating means, said toast holding member being provided with a notched portion; a spring for swinging said toast holding member toward an inoperative position; a locking bar mounted for movement into and out of locking engagement with said notch; spring means for automatically seating said locking bar in said notch when the toast holding member is moved against the action of said spring into its operative position relative to said heating means; a motor; a bracket pivotally connected with said motor; a release element pivotally supported on said bracket, a bell crank lever adapted to be actuated by said toast holding member when the same is moved into operative position for imparting movement to said bracket for establishing driving connection between said motor and said release element; means on said locking bar for engagement by said release element at the expiration of a predetermined interval of time for moving said locking bar from engagement with said notch to permit said first mentioned spring to move said toast holding member to its inoperative position; spring means for moving said bracket and said release element out of operative relation with respect to said motor; and spring means on said bracket for swinging said release element to its initial position when said bracket is moved to an inoperative position with respect to said motor.

8. In a control mechanism for an electric toaster, the combination of heating means; a toast holder mounted for movement into and out of operative relation with respect to said heating means; latch mechanism for releasably maintaining said toast holding member in operative position, said latch mechanism being provided with a shouldered portion; an electric motor; and a pivotally mounted arm adapted to be moved by said motor into engagement with said shouldered portion for actuating said latch mechanism to release said toast holding member at the expiration of a predetermined interval of time and a lever mechanism operable by said toast holding member for moving said arm into operative relation with respect to said motor.

9. In a control mechanism for an electric toaster, the combination of heating means; a toast holder mounted for movement into and out of operative relation with respect to said heating means; latch mechanism for releasably maintaining said toast holding member in operative position, said latch mechanism being provided with a shouldered portion; an electric motor; a pivotally mounted bracket member, an arm pivotally mounted on said bracket member and adapted to be moved by said motor into engagement with said shouldered portion for actuating said latch mechanism to release said toast holding member at the expiration of a predetermined interval of time, and a lever mechanism operable by said toast holding member for swinging said bracket member to move said arm into operative relation with respect to said motor.

WILLIAM L. O'NEILL.